United States Patent [19]
Ida

[11] Patent Number: 5,130,868
[45] Date of Patent: * Jul. 14, 1992

[54] APPARATUS AND METHOD FOR POSITIONING A TRANSDUCER FOR RECORDING, REPRODUCING OR ERASING INFORMATION ON A MEDIUM
[75] Inventor: Masatoshi Ida, Hachioji, Japan
[73] Assignee: Olympus Optical Co. Ltd., Hachioji, Japan
[*] Notice: The portion of the term of this patent subsequent to Mar. 28, 2006 has been disclaimed.
[21] Appl. No.: 642,061
[22] Filed: Jan. 16, 1991

Related U.S. Application Data

[63] Continuation of Ser. No. 205,165, Jun. 10, 1988, Pat. No. 5,012,362.

[30] Foreign Application Priority Data

Jun. 19, 1987 [JP] Japan ................. 62-152967
Jun. 27, 1987 [JP] Japan ................. 62-160144
Jul. 6, 1987 [JP] Japan ................. 62-168032

[51] Int. Cl.⁵ ............................. G11B 5/596
[52] U.S. Cl. ...................... 360/77.04; 360/57; 360/78.13; 360/109
[58] Field of Search .......... 360/57, 66, 106, 109, 360/103, 75, 71.04, 78.13, 78.14

[56] References Cited

U.S. PATENT DOCUMENTS 3,882,541  5/1975  Ghose et al. .
4,131,923  12/1978 Wachs et al. .
4,290,088  9/1981  Beecroft ..................... 360/66
4,315,289  2/1982  Holecek et al. .
4,383,283  5/1983  Machut .
4,396,965  8/1983  DeMoss .................... 360/103 X
4,414,592  11/1983 Losee et al. ............... 360/103 X
4,455,582  6/1984  Yanagida et al. ........... 360/66 X
4,651,247  3/1987  Fuke .
4,689,700  8/1987  Miyake et al. ............. 360/77.06 X
4,725,902  2/1988  Oda et al. .................. 360/66
4,811,133  3/1989  Nakada et al. ............. 360/78.11 X
4,849,832  7/1989  Yamagata et al. .......... 360/66
5,012,362  4/1991  Ida ........................... 360/77.04

FOREIGN PATENT DOCUMENTS 57-21133  7/1982  Japan .
59-3752   1/1984  Japan .
59-3753   1/1984  Japan .
59-3754   1/1984  Japan .
59-92253  6/1984  Japan .
60-64464  5/1985  Japan .
60-67562  5/1985  Japan .
60-67564  5/1985  Japan .
60-186557 12/1985 Japan .
60-192160 12/1985 Japan .
60-192161 12/1985 Japan .
60-192162 12/1985 Japan .
60-192163 12/1985 Japan .
60-192168 12/1985 Japan .
61-6966   1/1986  Japan .
61-6967   1/1986  Japan .
61-6968   1/1986  Japan .
63-42003  2/1988  Japan .

OTHER PUBLICATIONS

Nikkei Electronics, Jul. 2, 1987, pp. 80-85; published by Nikkei McGraw-Hill Title: Recording 25 StillPictures on a Floppy Disc of 47 mm in Diameter-Standard of Magnetic Disks for Electronic Still Cameras.
U.S. patent application Ser. No. 083,678; Toizumi, Y. and Kawase, D.; filed Aug. 7, 1987.
U.S. patent application Ser. No. 077,594; M. Ida; filed Jul. 24, 1987.

Primary Examiner—Aristotelis Psitos
Assistant Examiner—David L. Robertson
Attorney, Agent, or Firm—Kenyon & Kenyon

[57] ABSTRACT

An apparatus of the invention is capable of shifting a transducer, such as a head for erasing reproducing and recording information on a track formed on a recording medium, with fine positioning accuracy and high access speed. Further, the apparatus is capable of entirely erasing information to be erased on the medium by shifting the transducer with a desired degree while the transducer is excited for erasing operation. In the apparatus, a motion converting means, such as a disc cam or a helically grooved cylindrical cam, is employed for converting a primary rotating motion to a secondary stepwise motion so as to shift the transducer, presenting substantial dead band characteristics for the shifting motion. Further, a control means is employed for shifting the transducer over an area covering an information recorded track and the portions adjacent thereto to execute the erasing operation for an extended area along the track to be erased.

35 Claims, 11 Drawing Sheets

APPARATUS AND METHOD FOR POSITIONING A TRANSDUCER FOR RECORDING, REPRODUCING OR ERASING INFORMATION ON A MEDIUM

This is a continuation of application Ser. No. 205,165 filed Jun. 10, 1988 now U.S. Pat. No. 5,012,362.

BACKGROUND OF THE INVENTION

1. Field of the Invention

This invention relates to an apparatus for positioning a transducer, such as a magnetic head, for recording, reproducing or erasing information on a medium, and more particularly to an apparatus for both enough fine positioning and high-speed shifting of the transducer.

2. Description of the Prior Art

In recent years, systems such as an electronic still camera or a still video floppy disc player have been developed for recording still video signals on a floppy disc, a so-called disc pack, and reproducing the recorded images on a television tube. In order to record video information on a floppy disc, there are two types of recording techniques: field recording and frame recording. In field recording, the information for one field is recorded on one track to form a field picture. In frame recording, the information for a first field is recorded on one of two adjacent tracks (for example, the outer track) and the information for a second field is recorded on the other track (for example, the inner track), thus one frame of picture is obtained from the information for the first and second fields recorded on a pair of tracks.

For the electronic still cameras, uniform standards have been already established by THE ELECTRONIC STILL CAMERA CONFERENCE with respect to various items such as video recording format, etc. According to the standards, both field recording and frame recording are allowed for recording video signals on a magnetic recording medium (floppy disc). Therefore, it is provided that the data for discriminating between field recording and frame recording should be prerecorded so that the type of recording can be identified at the time of reproducing the image. The signal recorded for enabling the identification is called an identification (ID) code and is multiplexed with the video signal on the recording medium. That is, it is provided that a frame type recorder should make the frequency multiplexing of the ID codes of the field/frame recording on the video track. According to the standards, the frequency of the carrier for the recording of the identification data is 13 times the horizontal sync frequency $f_H$ (i.e., 204.54 KHz in the NTSC system), the modulation system is DPSK (Differential Phase Shift Keying), and the bit rate is such that one bit corresponds to the interval of 4H (H represents one horizontal scanning line period). (See NIKKEI ELECTRONICS, Jul. 2, 1984, etc.)

Further, bit allocation of ID codes is made as shown in FIG. 1. An interval of 4H (i.e., the interval of one bit) after the start point (front edge) of vertical synchronizing signal (V. SYNC) is an initial bit and the interval of 8H (i.e., the interval of two bits) following the initial bit is assigned for the ID codes of the field/frame recording. The data "00" in the two bit interval correspond to field recording and the data "01" or "10" correspond to frame recording. In the latter case, the data "01" and "10" represent the outer and inner tracks of a pair of frame-recorded tracks, respectively.

As explained above, the recording of a video signal on a floppy disc in an electronic still camera is made together with the ID code signal for each recording track and field and frame recordings may often coexist on the same floppy disc. As is well known, it is possible to rewrite or erase recorded information on a desired track of a floppy disc. However, in a floppy disc where field and frame recordings coexist, a problem arises when the information recorded on an arbitrary track is erased. If the erased track is a field-recorded track, video information for one frame of picture is erased, which causes no concern. However, if the erased track is one of a pair of frame-recorded tracks, the other track remains unerased. The unerased track continues to have the ID code signal representing that it is one of a pair of frame-recorded tracks (for example, the outer track). When the unerased track is reproduced, it is identified as a frame-recorded track and either two different images or one field image and an unrecorded portion will be reproduced as one frame of picture, which causes inconvenience.

It is desirable that a system for erasing information recorded on a track should be capable of providing a control for the head positioning and exciting based on the ID codes previously detected from record tracks intended to be erased, so as to automatically erase a group of tracks on which respective parts of a unitary amount of information are recorded. A specific example of such a system will be suitably applicable to erase a pair of frame recorded tracks on a video floppy disc based on the ID codes recorded with the video signal using the frequency division multiplexing method. As explained above, in conformity with the standard specifications for a recording system on a magnetic disc, the Still Video Floppy System provided by THE ELECTRONIC STILL CAMERA CONFERENCE, the ID code indicates whether a track played back consists of a field picture or a frame picture, and this code shall be recorded whenever a frame picture is recorded. An example of such a system should comprise means for detecting ID code so as to determine whether a track to be erased is a field recorded track or a frame recorded one and further determine whether a frame recorded track is an outer side track or an inner side track. Then, the system takes appropriate action to erase a pair of frame picture tracks entirely including one previously intended to be erased based on the above-mentioned determination.

On the other hand, in case recorded information on a track is erased by utilizing a head having a head gap with its width substantially equal to the width of the track, several parts of the recorded information or signals still remain edgewise in the track due to eccentricity for setting of the floppy disc, expansion and contraction or warp of the floppy disc, or a probable error for head positioning which occurs in the other corresponding apparatus employed to erase the information on that track.

It has been proposed for such a system to entirely erase recorded information on a track by shifting the erase head in a direction traversing the track while rotating a recording medium (that is, floppy disc) in a plurality of turns (see Published Japanese Utility Model Application, Publication No. 57-21133). A fine pitch shifting operation is desired to accomplish such a purpose as mentioned above. A fine pitch shifting operation is also desired to control head position so as to regularly trace a track formed on the recording medium.

However, in a conventional system, when a motion converting device having such characteristics that a large amount of primary (input) motion causes a small amount of secondary (output) motion is employed for a fine pitch shifting operation of the head, a high-speed head access (that is, head shifting from one track to the next) is inevitably sacrificed.

SUMMARY OF THE INVENTION

It is, therefore, an object of the present invention is to provide an apparatus capable of shifting a transducer with fine positioning accuracy and high-speed access.

Another object of the present invention is to provide an apparatus capable of entirely erasing information to be erased on a recording medium by shifting a transducer to a desired degree while exciting the transducer for erasing operation thereof with its relative movement to the medium.

In a specific example of an apparatus in accordance with the invention, a motion converting means such as a disc cam or a helically grooved cylindrical cam is employed for converting a primary rotating motion to a secondary stepwise motion to shift a transducer, presenting substantial dead band characteristics or the like.

Further, a control means is employed for shifting the transducer over an area covering an information recorded track and the portions adjacent thereto by driving the motion converting means in an appropriate manner and for exciting the transducer while the transducer is being shifted over the above-mentioned area.

In a different example, a motion converting means such as a disc cam or a helically grooved cylindrical cam with a noticeable characteristic is employed for converting a primary input motion transmitted from a driving force generating means to a secondary output motion to be transmitted to a transducer movable along a surface of an information recording medium so as to produce an appropriate motion of the transducer for entirely erasing information to be erased and also for high-speed transducer access. In this example, the motion converting means is operatively connected to the driving force generating means and to a transducer support carriage which supports the transducer so as to convert a primary input motion from the driving force generating means to a secondary output motion transmitted by the motion converting means to the transducer support carriage. The motion converting means has a motion conversion characteristic including a plurality of sluggish characteristic regions, first characteristic regions adjacent to the sluggish characteristic regions and second characteristic regions linking up the first characteristic regions. In the sluggish characteristic regions, a zero or minute secondary output motion corresponds to a rated primary input motion. In the first characteristic regions, a relatively small secondary output motion corresponds to the rated primary input motion. In the second characteristic regions, a relatively large secondary output motion corresponds to the rated primary input motion.

A stable transducer positioning is always attained in a recording operation mode of the system by utilizing the sluggish characteristic regions, even if resonance, overshoot or vibration occurs during a settling time of the driving force generating means such as a stepping motor. An appropriate fine pitch shifting of the transducer for the entirely erasing operation can be realized in an erasing operation mode of the system by utilizing the first characteristic regions. Further, a high-speed transducer access can be realized by utilizing the second characteristic regions of the motion converting means.

BRIEF DESCRIPTION OF THE DRAWINGS

FIG. 3 (b) is a reversed, detailed plan view, on an enlarged scale, of a portion b of a cam, as a motion converting element, in FIG. 3(a);

DESCRIPTION OF THE PREFERRED EMBODIMENTS

Figure 1:
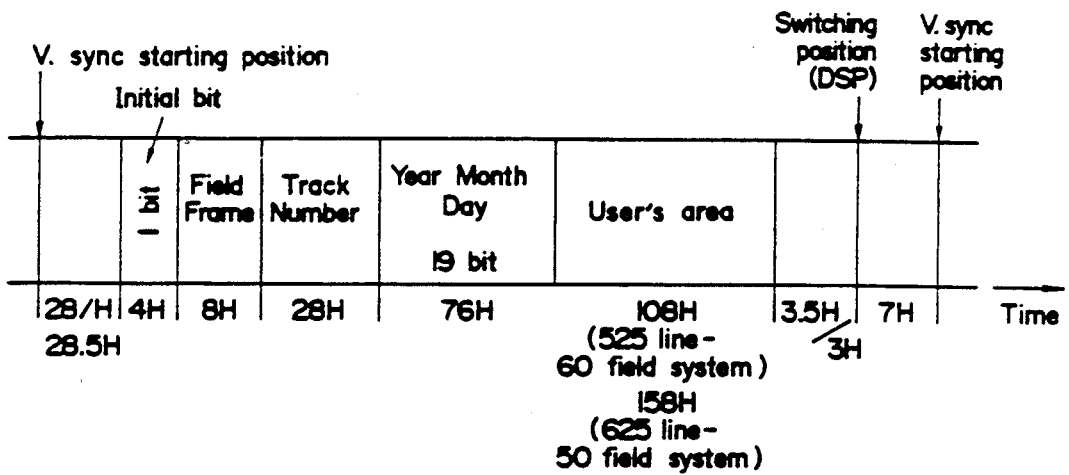
FIG. 1 is a diagram showing the bit allocation of identification (ID) codes in accordance with the standards for electronic still cameras.
Figure 2:
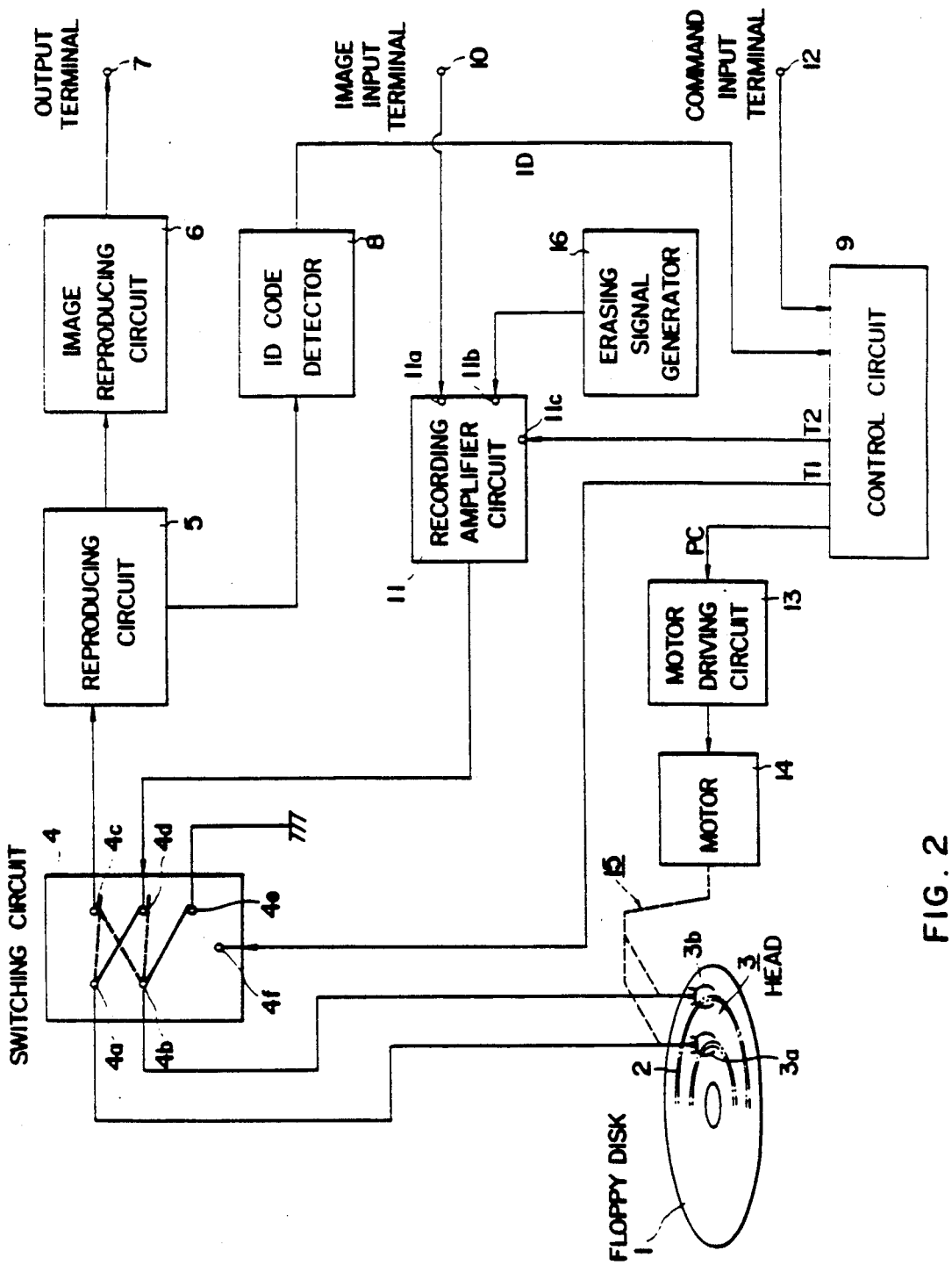
FIG. 2 is a block diagram showing an electric circuit of an apparatus as an embodiment of the present invention.

Apparatus in accordance with the invention may be used in a number of recording systems utilizing a magnetic disc contexts, but particularly useful applications are found in still video floppy systems, a particular example of which is shown in FIG. 2.

FIG. 2 is a block diagram showing an electric circuit portion of an apparatus according to the present invention adapted to be used for a still video floppy disc player. In FIG. 2, a still video floppy disc 1 is provided with a plurality of concentric annular tracks 2, to and from which signals are given and received respectively by a multihead 3 of the two-channel type as a transducer which is an element of this invention. The head 3 is an in-line head which includes an inner head 3a positioned inwardly and an outer head 3b positioned outwardly in the radial direction of the floppy disc 1, with their head gaps aligned in the radial direction. The inner head 3a and the outer head 3b are connected to a first terminal 4a and a second terminal 4b of a switching circuit 4, respectively. The switching circuit 4 further includes a third terminal 4c, a fourth terminal 4d, a fifth terminal 4e (grounded) and a sixth terminal 4f, and the first and second terminals 4a and 4b are selectively connected with the third, fourth and fifth terminals 4c, 4d and 4e in response to changeover control signals T1 applied to the sixth terminal 4f. In reality, the sixth terminal 4f comprises a plurality of terminals corresponding to the number of the changeover control signal lines. The third terminal 4c of the switching circuit 4 is connected to the input of a reproducing circuit 5 for amplifying to a predetermined level the signals detected by the head 3. One of two outputs of the reproducing circuit 5 is connected to the input of an image reproducing circuit 6 for processing the video signal to demodulate and display it on a monitor, and the output of the image reproducing circuit 6 is connected to an image output terminal 7. The other output of the reproducing circuit 5 is connected to the input of an ID code detector 8 for demodulating the data signal (ID signal) multiplexed with the video signal as stated above, and the output data of the ID code detector 8 are supplied to an input of a control circuit 9. An image input terminal 10 is provided for receiving from the outside a video signal to be recorded and the terminal 10 is connected to a first terminal 11a of a recording amplifier circuit 11. The recording amplifier circuit 11 further has a second input terminal 11b and a third input terminal 11c. The recording amplifier circuit 11 includes an amplifying circuit, a modulating circuit, a changeover switching circuit, etc., all of which are known in themselves, and is so constructed as to, in response to a signal T2 supplied to the third input terminal 11c, selectively either modulate by the video signal supplied to the first input terminal 11a, an FM signal of a predetermined level suitable for recording and output the modulated signal, or amplify to a sufficiently high level an erasing signal supplied to the second input terminal 11b and output it the amplified signal. The control circuit 9 includes for example a microcomputer and is designed so that various command signals for designating the number of a track to be erased, commanding the erasing operation, etc., are fed to the control circuit 9 through a command signal input terminal 12 and that the control circuit 9 receives the ID code signal from the ID code detector 8 and supplies the changeover control signals T1 and T2 to the sixth terminal 4f of the switching circuit 4 and the third input terminal 11c of the recording amplifier circuit 11, respectively. The control circuit 9 further supplies to a motor driving circuit 13 a position control signal PC for controlling the position of the head 3. The motor driving circuit 13 is so constructed as to, in response to the position control signal PC, supply electric power to a motor 14 for rotating the motor 14 by an angle corresponding to the signal PC. The rotational motion of the output shaft of the motor 14 is converted to linear motion through a motion transmitting mechanism 15 schematically shown by the broken line in FIG. 2 and is transmitted to the head 3. As specifically described below, this embodiment employs a characteristic mechanism as the motion transmitting mechanism 15. Further, the second input terminal 11b of the recording and amplifying circuit 11 is to receive the output of an erasing signal generating circuit 16 for generating an erasing signal which is an alternating current signal of a sufficiently high level for erasing the record of the floppy disc 1.

The operation of the electric circuit of the present system will now be described. It is assumed that the command to erase the n-th track is inputted to the control circuit 9 through the command signal input terminal 12 by using an operation switch (not shown) etc. In response to the input, the control circuit 9 supplies to the motor driving circuit 13 a position control signal PC for shifting the inner head 3a of the head 3 to the n-th track position. In response to the output of the motor driving circuit 13, a motor 14 shifts the head 3 via a motion transmitting mechanism 15 so that the inner head 3a is positioned above the n-th track. The control circuit 9 can recognize a present position of the head 3 through known means, for example, a potentiometer, photoelectric encoder, or the like (not illustrated). When the inner head 3a is positioned above the n-th track, the first and third terminals 4a and 4c of the switching circuit 4 are connected to each other in response to the changeover control signal T1 from the control circuit 9 and the output detected by the inner head 3a is supplied to the reproducing circuit 5. One of the output signals of the reproducing circuit 5 is processed by the image reproducing circuit 6 and supplied to the image output terminal 7. If a monitor is connected to the terminal 7, the image recorded on the n-th track can be observed. The other output of the reproducing circuit 5 is supplied to the ID code detector 8. The ID code detector 8 demodulates the ID code signal modulated by the DPSK (Differential Phase Shift Keying) modulation method and multiplexed with the video signal and supplies the demodulated data to the control circuit 9. As explained above, according to the standards for electronic still cameras, when the data of two bits representing the field recording or frame recording are "00", it means that the track (in this case, the n-th track) is a field-recorded track; the data "01" and "10" mean the outer and inner tracks of frame-recorded tracks, respectively. The control circuit 9 discriminates among the demodulated data and correspondingly outputs the changeover control signals T1 and T2 and the position control signal PC.

In a first case where the n-th track is found to be a field-recorded track, the first and fourth terminals 4a and 4d of the switching circuit 4 are connected with each other in response to the changeover control signal T1 while the head 3 is not shifted by the position control signal PC. In addition, the operation of the recording amplifier circuit 11 is changed over by the changeover control signal T2. That is to say, in the recording amplifier circuit 11, the first input terminal 11a normally receiving the signal from the image input terminal 10 is changed over to its isolated state and instead the erasing signal from the erasing signal generating circuit 16 is received via the second terminal 11b, amplified to a sufficient level for erasing operation and outputted. Then, the amplified erasing signal is supplied to the inner head 3a via the fourth and first terminals 4d and 4a of the switching circuit 4 and the information recorded in the entire circle of the n-th track is erased as the floppy disc rotates. Thus, the erasing operation of the field-recorded track is finished and the control circuit 9 returns to the standby condition.

Next, a second case where the n-th track is found to be the outer track of frame-recorded tracks will be described. First, the erasure of the n-th track itself is performed in the same manner as the erasure of the field-recorded track. Then, in response to the position control signal PC of the control circuit 9, the motor driving circuit 13, the motor 14 and the motion transmitting mechanism 15 operate so that the inner head 3a is shifted to the n+1-th track which is the next inner track with respect to the n-th track. After the head has been shifted, the changeover of the connection in the switching circuit 4 and the changeover of the operation of the recording and amplifying circuit 11 are made in the same manner as in the erasure of the field-recorded track and the amplified erasing signal is supplied to the inner head 3a to erase the n+1-th track. Thus, both the n-th and n+1-th tracks as a pair of tracks forming a frame picture are erased and then the control circuit 9 returns to the standby condition.

In a third case where the n-th track is found to be the inner track of frame-recorded tracks, again the erasure of the n-th track itself is made in the same way as the erasure of the field-recorded track in the above first case. Then, the changeover of the connection in the switching circuit 4 is performed in response to the changeover control signal T1 while the head is remains in the same position under the control of the position control signal PC. That is to say, in the switching circuit 4, the connection of the first and fourth terminals 4a and 4d established at the time of the erasure of the n-th track is released and instead the second and fourth terminals 4b and 4d are connected to each other. In addition, in response to the changeover control signal T2, the recording amplifier circuit 11 operates to amplify and output the erasing signal and the amplified erasing signal is supplied to the outer head 3b. Therefore, the n−1-th track, the next outer track with respect to the n-th track, is erased by the outer head 3b. Thus, both the n−1-th and n-th tracks as a pair of tracks forming a frame picture are erased and then the control circuit 9 returns to the standby condition.

Naturally, in the third case, if the capacities of the erasing signal generating circuit 16 and the recording amplifier circuit 11 are large enough, both the first and second terminals 4a and 4b of the switching circuit 4 may be connected to the fourth terminal 4d to supply the erasing signal to the outer and inner heads 3b and 3a simultaneously so that the n−1-th and n-th tracks forming a frame picture can be erased at the same time.

Further, many variations and modifications can be made within the scope of the present invention It is possible that all of the tracks of the floppy disc 1 mounted on the present apparatus are previously scanned by the head 3 to detect the ID codes of each track, the result of which is stored in a memory of the control circuit 9, and that when the number of a track to be erased is designated by the command signal from the terminal 12, the recording mode field/frame is identified in accordance with the contents of the memory to make erasing operation. In this case, the head of the two-channel type always accesses a pair of frame-recorded tracks in a single action so that the two tracks can be erased simultaneously. Moreover, the head 3 in FIG. 2, which is of the in-line, two-channel type with both channels being used for recording, reproducing and erasing, may be replaced with a single head. Alternatively, a head for erasing only may be provided in addition to a head for recording and reproducing. In these cases, it is necessary to provide head access to the second track of a pair of frame-recorded tracks to be erased. Except for this, their operation is substantially the same as the above-described operation of the embodiment shown in FIG. 2.

As described above, various heads may be used for erasing. However, when the erasing operation is made by a head which is not for erasing only, the following problem arises when the erasing is made by a head having the same width as that of a head used for recording, it is possible that the side edge portions of a track cannot be completely erased because of the eccentricity of the floppy disc 1 at the time of its mounting; the expansion, contraction or distortion of the floppy disc 1 itself; the error of controlling the position of the head, etc. In order to resolve this problem, it has been proposed that the erasing of a track is made with the head shifted in the direction of width of the track to be erased while the floppy disc makes at least two revolutions, thereby preventing unerased portions from remaining (above-mentioned Published Japanese Utility Model Application, Publication No. 57-21133). For that purpose, it is preferable that the shift pitch of the head in the direction of width of the track is fine. With such a fine shift pitch, however, high-speed head access will be difficult and poses a new problem. Generally, in order to execute a relatively long shifting operation, such as a shift from track to track, using a high-resolution shifting mechanism capable of fine pitch shifting, it is necessary to provide a primary drive (for example, the rotation of a motor) of a great many steps or a very high speed of rotation.

In the present embodiment, in order to resolve such problems, a very characteristic mechanism as described below is employed as the motion transmitting mechanism 15.

Figure 3A:
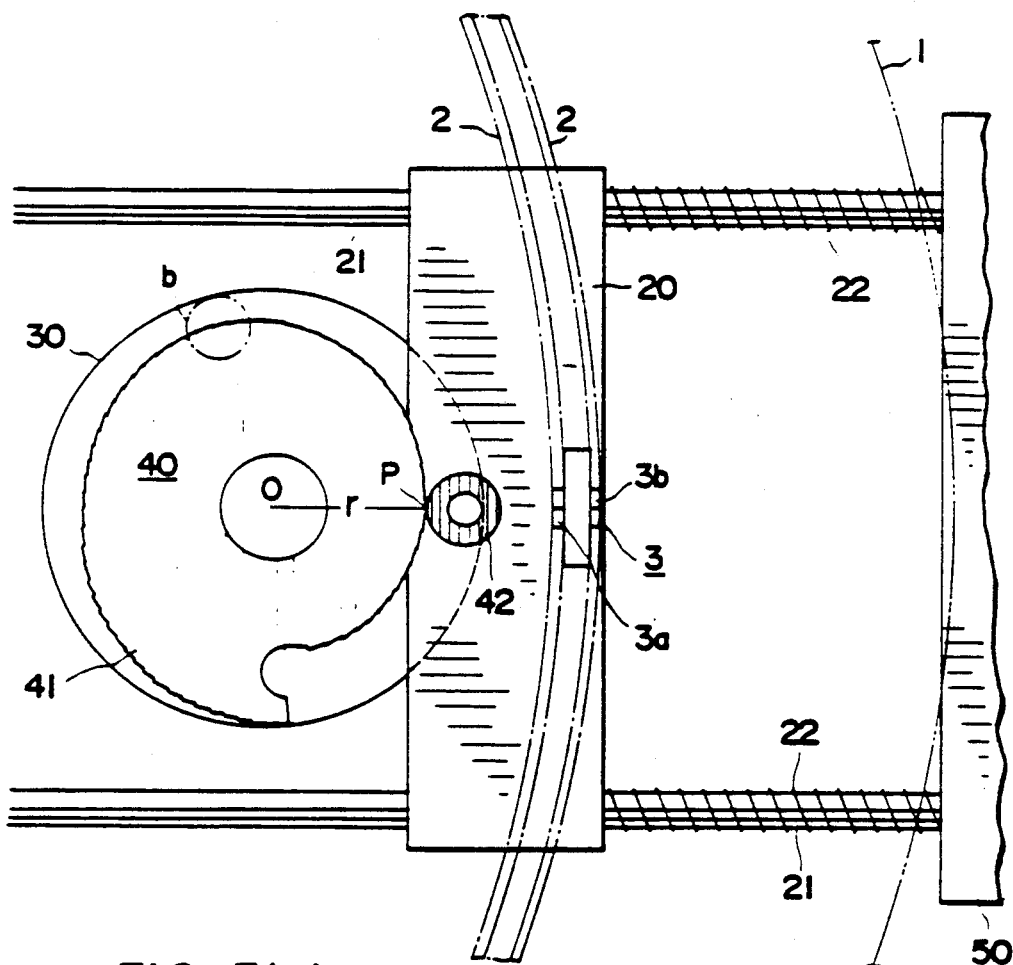
FIG. 3 (a) is a plan view showing a motion transmitting mechanism of the apparatus shown in FIG. 2.
Figure 3B:
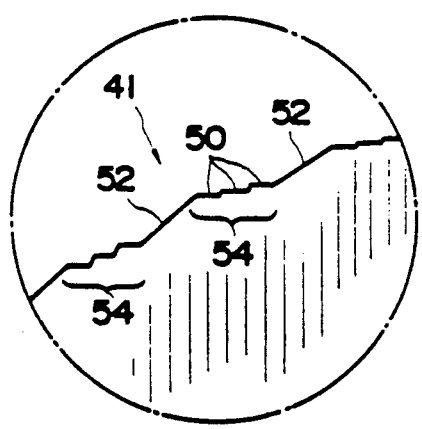
Figure 4:
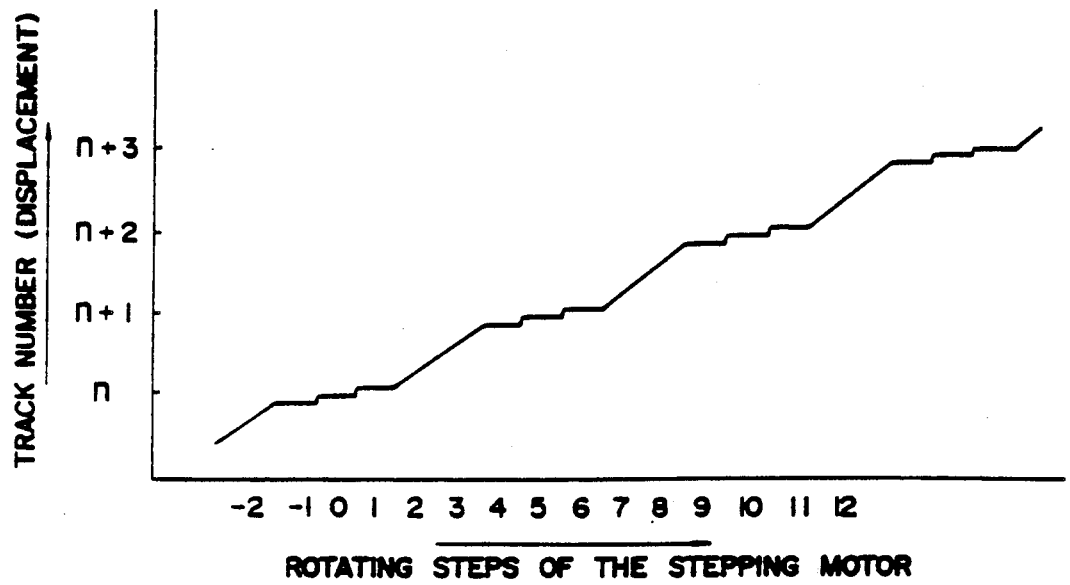
FIG. 4 is a graph depicting motion conversion characteristics of the mechanism in FIG. 3 (a)

FIG. 3(a) shows a motion transmitting mechanism of the apparatus shown in FIG. 2. In FIG. 3(a), a head 3 is a head of the in-line, two-channel type having an inner head 3a and an outer head 3b. The head 3 is mounted on a movable head carriage 20 guided by two guide rods 21. A disc cam 41 which serves as a motion converting element is rotatably driven by a stepping motor 30 which is employed as the motor 14 in FIG. 2. The cam 41 and a cam follower 42 mounted on the carriage 20 to rollingly contact the cam 41 form a motion converting mechanism 40. Both guide rods 21 are fixedly secured at their right ends in FIG. 3(a) to a structural member 50 of the present apparatus. The left ends (not shown) of the guide rods are also fixed in the same way. Both guide rods 21 traverse insertion holes provided in the head carriage 20 to movably support and guide the head carriage 20. Compressible coil springs 22 are arranged around the peripheral surfaces of the guide rods 21 between the right side of the head carriage 20 and the left side of the structural member 50 shown in FIG. 3(a), thereby constantly exerting on the head carriage 20 a biasing force directed towards the cam 41. For this reason, the cam follower 42 mounted on the carriage 20 will always rollingly contact the cam 41 elastically. A still video floppy disc 1 is rotatably driven by a spindle motor (not shown) and is positioned as indicated by the dash-double dot line so that annular information recording tracks 2 formed on the floppy disc 1 can be traced by the head 3. In accordance with the present invention, the motion converting cam element 41 has a characteristic peripheral surface or edge as shown in FIG. 3(b), which is a reversed enlarged view of portion b of FIG. 3(a). As illustrated in FIGS. 3(a) and 3(b), the distance r between the axis of rotation O of the cam 41 and a position P on its peripheral surface contacting the cam follower 42 increases in the counterclockwise direction with fine step-by-step increments 50 and with larger incremental steps 52 at regular intervals. Each fine step-by-step incremental portion 54 constitutes a fine step pitch shifting region to provide the head 3 with a relatively fine displacement for ensuring complete erasure of a track to be erased without any unerased portion remaining along the side edges of the track and for proper tracking with respect to a specific track. Each larger step portion 52 constitutes a rough pitch shifting region to provide the head 3 with a relatively large abrupt displacement for the shift between the tracks. The motion conversion characteristics of the cam 41 will be understood more clearly from the graph of FIG. 4. In FIG. 4, the angle of rotation of the stepping motor 30 is represented on the horizontal axis by the number of steps and the displacement of the head (corresponding to the above-mentioned distance r) is represented on the vertical axis by the track number on the medium. With respect to the vertical axis, the distance between adjacent tracks, for example, is measured from the center of the n-th track to the center of the adjacent n+1-th track and is the so-called track pitch. For an electronic still camera, the standard pitch is 100 μm.

The operation of the motion transmitting mechanism having the above-described structure will now be described. It is assumed that when the inner head 3a of the head 3 traces the regular position of the n-th track on the recording medium 1, the cam 41 is in its standard position of rotation, i.e., at the center step position of O in a fine step pitch shifting region 54 shown in FIG. 4. In reality, the track may be displaced from its regular position because of a positional error by a recording apparatus at the time of track recording, because of eccentricity or inexact displacement by a rotational drive in a reproducing apparatus, etc. Accordingly, at the time of erasing, it is necessary to shift the head in the direction of width of the track to make erasing operation during a plurality of revolutions of the medium and, at the time of reproducing, tracking control is necessary for finely displacing the head to follow the actual position of the track.

An example of erasing operation for the n-th track in the present embodiment will be described. In response to a command to erase the n-th track, the stepping motor 30 rotates the cam 41 to a position (the step position −2 in a part of the rough step pitch shifting region shown in FIG. 4) which is two steps before the standard position of rotation of the cam 41 where the head 3a traces the regular position of the n-th track. In this position, erasing current is supplied to the head 3a and the floppy disc is driven to make one revolution so that an annular portion of the n-th track including its outer side edge is circularly erased. Then, the cam 41 is rotated to its standard position of rotation for the n-th track (the center step position 0 in the fine step pitch shifting region shown in FIG. 4), where the head 3a performs circular erasure with respect to the standard position of the n-th track. Further, the cam 41 is rotated to a position (the step position 2 in a part of the rough step pitch shifting region shown in FIG. 4) which is two steps after the standard position of rotation of the cam 41 for the n-th track and in this position an annular portion of the n-th track including its inner side edge is circularly erased in the same way as described above. Clearly, the stepwise operation of the cam 41, therefore of the head 3a, is made in response to the position control signal PC from the control circuit 9 in FIG. 2. In the present apparatus, since an erasing operation is effectuated as described above, the annular area with its width extending from the standard position of the n-th track to the outer and inner side edges is circularly erased. Therefore, no unerased portions will remain along sides or edges of the track. Although the erased area is extended by ±2 steps in the above embodiment, the number of steps for erasing may be set arbitrarily, for example ±3, if necessary. Of course, any other order of tracks than that from outer to inner track may be selected for erasure.

What is essential in the above-mentioned embodiment is that the head is moved in a range including the fine step pitch shifting region and at least a part of the rough pitch shifting region for the motion converting means while the erasing operation is executed for a track to be erased.

Next, the operation at the time of reproduction and head access will be described. In this embodiment, in order to effectuate tracking control for the n-th track, driving pulses are supplied from the motor driving circuit 13 in FIG. 2 to the stepping motor 14 (30 in FIG. 3(a)) to cause an angle of rotation of, for example, one step (1 unit on the horizontal axis in FIG. 4) in the positive direction (the counterclockwise direction in FIG. 3(a)), or one step (−1 unit on the horizontal axis in FIG. 4) in the opposite direction, whereby the fine step pitch shifting region 54 of the cam 41 operates to properly implement fine tracking control. Responding to fine stepping revolution of the cam 41, the cam follower 42 is relatively dislodged into an adjacent fine step of the cam 41 very easily. Accordingly, a delicate and very sensitive tracking control can be performed. On the other hand, when the head 10 accesses the n+1-th track from the n-th track, the rough pitch shifting region 52 corresponding to the second and third rotating steps of the stepping motor 30 shifts the head 10 with a relatively abrupt displacement so that the head 10 shifts quickly from the n-th to n+1-th track position. Of course, the tracking control for the n+1-th track is made in the same way as the n-th track. The head access and tracking control for the n+2-th, n+3-th, ... tracks are also made in the same manner.

Figure 5:
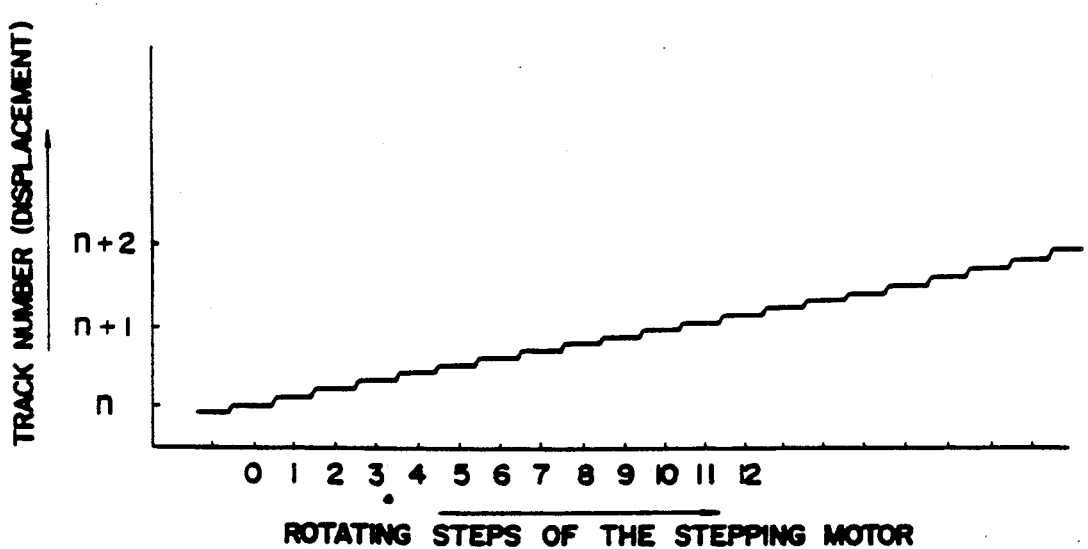
FIG. 5 is a graph showing the motion conversion characteristics of a conventional motion transmitting mechanism which does not have such characteristics as shown in FIG. 4.

The motion converting cam 41 is designed such that the fine step pitch shifting region 54 is provided in a predetermined range necessary for a fine shifting of the head in the direction of width of the track to facilitate an erasing operation and for tracking control (±1 step in FIG. 4) around the standard or zero position of each track (step positions 0, 5, 10, ... in FIG. 4) and each rough pitch shifting region 52 is provided between two respective fine step pitch shifting regions 54. In this embodiment, inasmuch as each fine pitch shifting region 54 is formed by a plurality of fine steps 50 each having a pause range (a flat portion of the step), the influence of the ripple components of the rotation of the motor 30 (therefore the cam 41), if any, can be minimized to realize stable tracking at an optimum fine step. Moreover, it will be clearly understood how the speed of head access is increased by virtue of the rough pitch shifting regions 52 of the motion converting element according to the present invention, if the motion converting characteristics in FIG. 4 are compared with the characteristics in FIG. 5 of an ordinary cam formed with a fine step pitch shifting region only.

Figure 6:
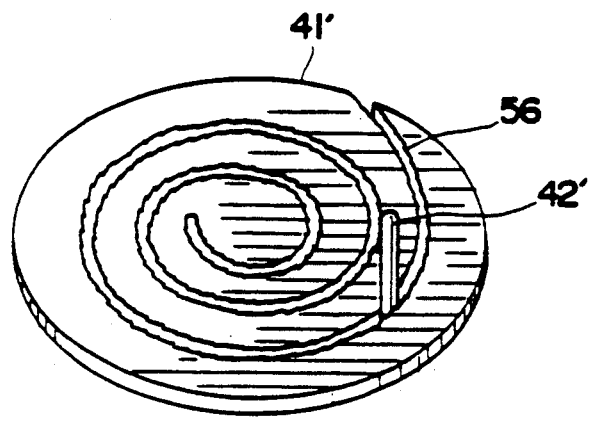
FIG. 6 is a perspective view showing a variation of the mechanism in FIG. 3 (a)

Many variations and modifications can be made with respect to the present mechanism. For example, the cam 41 and the cam follower 42 of the motion converting mechanism 40 of FIG. 3(a) may be replaced with a cam 41' having a spiral groove 56 and a pin-shaped cam follower 42' projecting into the groove, as shown in FIG. 6. The grooved cam 41' serves as a motion converting element and is formed to be mounted in the same manner as the cam 41 in FIG. 3(a) and rotatably driven by the stepping motor 30. The pin-shaped cam follower 42' is provided in place of the cam follower 42 on the head carriage 20 in FIG. 3(a). Clearly, the positional relationship between the grooved cam 41' and the cam follower 42' should be adjusted so that the tip of the cam follower 42' can trace the groove 56 of the cam 41' correctly. The cam groove 56 is formed to have motion converting characteristics including fine step pitch shifting regions and rough pitch shifting regions in such a manner that the relationship between the angle of rotation of the cam 41' and the distance from the axis of rotation of the cam 41' to the position where the cam follower 42' slidably contacts the cam groove is identical to that shown in FIG. 4. Therefore, when the elements shown in FIG. 6 are used as a motion converting mechanism in a system pursuant to the present invention, the mechanism provides the same operation and effect as the embodiment described above with reference to FIGS. 3 and 4. Moreover, when the elements shown in FIG. 6 are used as a motion converting mechanism, biasing means 22 as shown in FIG. 3(a) can be omitted by selecting the shape and dimension of the groove properly.

As described above, this embodiment for erasing a still video floppy disc has an advantage that when a frame-recorded track is erased, a pair of tracks corresponding to the frame are automatically erased, thereby preventing one of the tracks from remaining unerased.

Now, another embodiment of the present invention will be described below with reference to FIG. 7.

Figure 7:
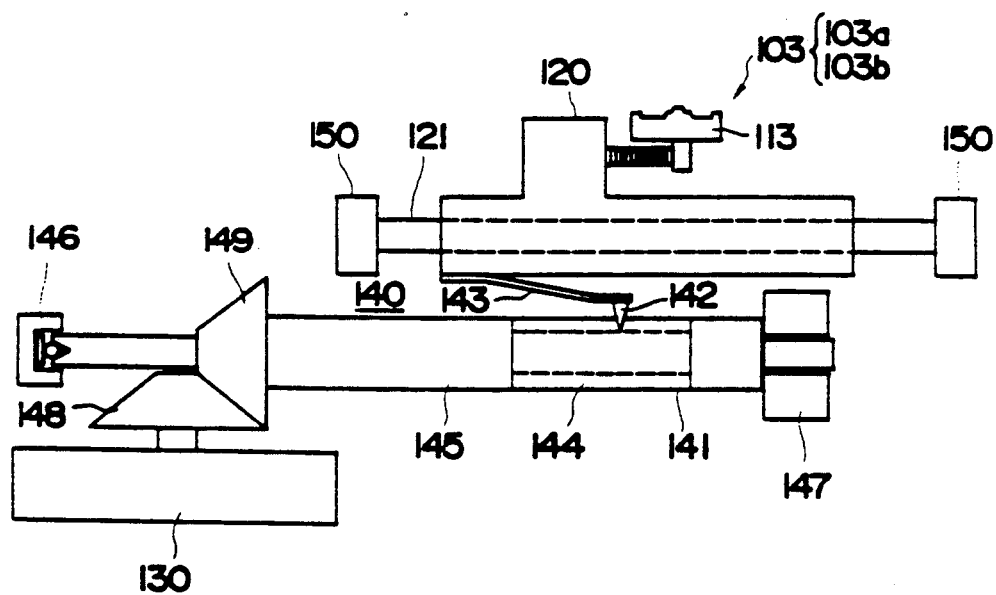
FIG. 7 is a simplified side view showing a motion transmitting mechanism of an another embodiment of the present invention.

FIG. 7 is a simplified side view showing a motion transmitting mechanism of the embodiment of the present invention. In FIG. 7, each element corresponding to that of FIG. 3(a) is designated by a numerical sign of such number as a sum of the number applied in FIG. 3(a) and one hundred. A head 103 with a pad means 113, as a transducer, is supported by a head support carriage 120 being slidably guided along a pair of guide rods 121 penetrating therethrough. The pad means 113 of the head 103 is provided for obtaining an optimal head touch to the medium by utilizing hydrodynamic phenomena. The pad means 113 is formed as a lower part of the head 103 buried in the center portion thereof and is shaped, when observed from the top, as a disc or orbicular block the top surface of which is formed as having a shallow annular groove, with a flat bottom, encircling the head 103. When a relative velocity of the recording medium with respect to the head 103, therefore the pad means 113, is over a predetermined degree, the medium is attracted to the head 103 by a hydrodynamic working of the pad means 113, so that a good head touch is obtainable. On the other hand, when the velocity of the medium is lower than the predetermined degree, the medium is not attracted to the head 103 and the pad means 113, therefore a good characteristic for starting the motor is obtainable under a relatively light load condition. The guide rods 121 are fixedly secured at their both ends to a structural member 150. A cam follower piece 142 is provided under the head support carriage 120 utilizing an elastic member such as a leaf spring 143 one end of which is fixed under the head support carriage 120 and the other end of which supports the cam follower piece 142.

A cylindrical cam 141 has an approximately helical groove 144 formed on a predetermined portion of the peripheral surface of a cylindrical shaft 145 one end of which is rotatably supported by a thrust bearing 146 and the other end of which is supported by a radial bearing 147. The cylindrical cam 141 is positioned at its regular position in the thrust direction thereof by the bearings 146 and 147. The cam follower piece 142 is always shoved into the groove 144 of the cylindrical cam 141 by a biasing force of the leaf spring 143. A driving force from the motor 130 such as a stepping motor is transmitted to the cylindrical cam 141 via bevel gears 148 and 149. The cylindrical cam 141 and the cam follower 142 form a motion converting mechanism 140 for converting a rotating motion of the motor 130 to a linear motion in a direction traversing the tracks on a recording medium (not shown). The motion conversion characteristics of the mechanism 140 are identical with those of the above-mentioned motion converting mechanism 40, as shown in FIG. 4. An electric circuit for driving the motor 130 in FIG. 7 is identical with that of FIG. 2. Therefore, the apparatus shown in FIG. 7 is capable of entirely erasing information on a track to be erased, in the same manner as described above with reference to the system of FIGS. 2, 3(a) and 3(b). Namely, in the erasing operation mode, the head support carriage 120, therefore the head 103 of FIG. 7, is shifted, covering a range including a fine step pitch region and a part of the rough pitch shifting region, so as to entirely erase the information track.

Still another embodiment of the present invention will be described below with reference to FIGS. 8 and 9.

Figure 8:
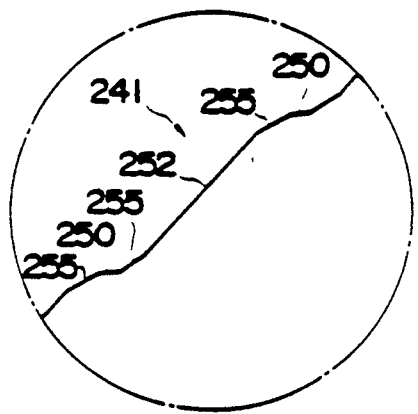
FIG. 8 is a reversed, detailed plan view, on an enlarged scale, of a portion of a motion converting element of another embodiment of the present invention.

FIG. 8 is a reversed, detailed plan view, on an enlarged scale, of a motion converting element of the still another embodiment to be contrasted with the embodiment of FIGS. 3(a) and 3(b). This motion converting element is to be substituted for that of FIG. 3(a) which takes approximately the same assembly form as that of this embodiment. That is, a mechanical assembly form of a transducer positioning apparatus of this embodiment is the same as that of FIG. 3(a) except for the motion converting element shown in FIG. 3(b). In this apparatus, the motion converting element, i.e., a disc cam 241, of FIG. 8 is employed for converting an output rotating motion of the stepping motor as a driving force generating means to a linear motion of a head support carriage, therefore that of a head as a transducer. An electric circuit for this apparatus is identical to that of FIG. 2.

Figure 9:
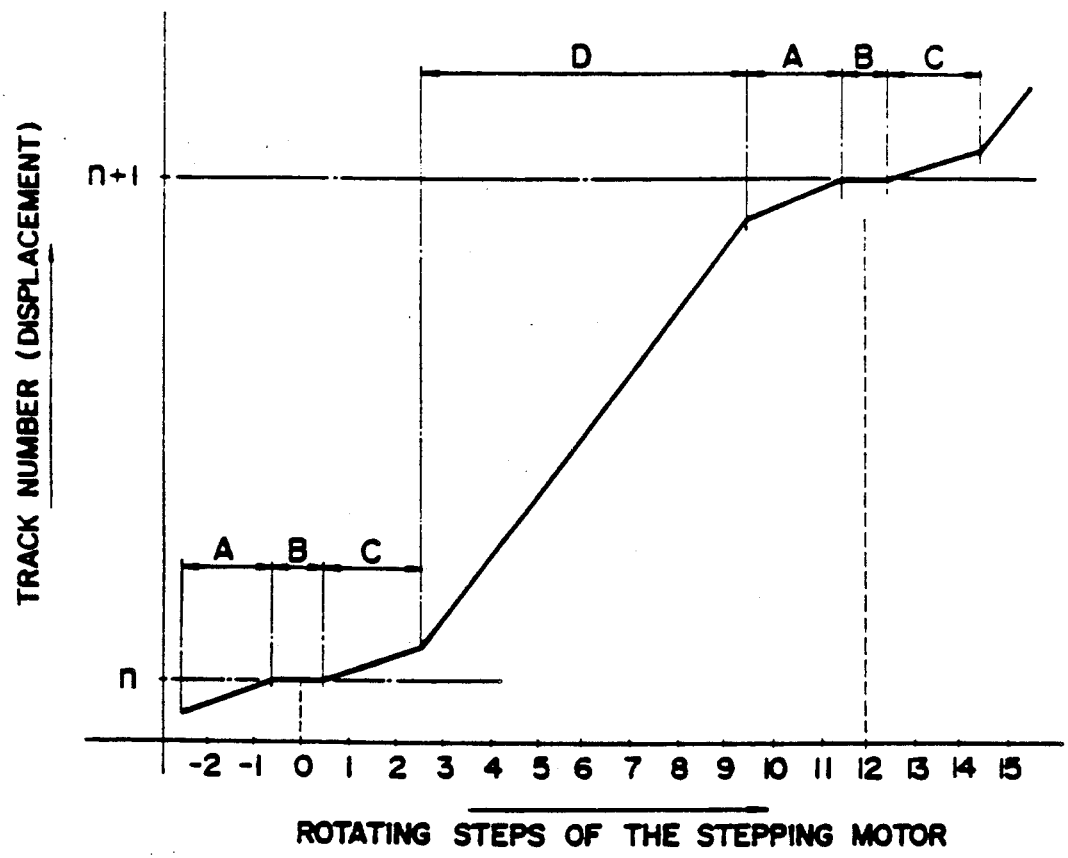
FIG. 9 is a graph depicting motion conversion characteristics of the mechanism in FIG. 8.

FIG. 9 is a graph depicting motion conversion characteristics of the element shown in FIG. 8. In FIG. 9, in common with FIG. 4, the angle of rotation of the stepping motor for driving the disc cam of FIG. 8 is represented on the horizontal axis by the number of steps and the displacement of the head is represented on the vertical axis by the track number on the medium.

As shown in FIGS. 8 and 9, the disc cam 241 has a peripheral surface comprising a plurality of sluggish characteristic portions 250, first characteristic portions 255 adjacent to the sluggish characteristic portions 250, and at least one second characteristic portion 252 linking up the first characteristic portions 255. The sluggish characteristic portions 250 correspond to sluggish characteristic regions B of FIG. 9; the repetitive first characteristic portions 255 correspond to first characteristic regions A and C of FIG. 9; and the second characteristic portion 252 corresponds to a second characteristic region D of FIG. 9. In the sluggish characteristic regions, a zero or minute head displacement is developed responding to a rated primary input motion (i.e., one step revolution of the stepping motor) to the motion converting mechanism. In the first characteristic regions, a relatively small head displacement is developed responding to the one step revolution of the stepping motor. In the second characteristic region, a relatively large head displacement is developed responding to the one step revolution of the stepping motor. Operations of this apparatus will be described below, assuming that the circuit of FIG. 2 is applied as an electric circuit for driving the head 3 and the stepping motor 14 of FIG. 2.

An example of erasing operation for the n-th track in this apparatus of the present embodiment will be described with reference to FIGS. 2, 8 and 9. In response to a command to erase the n-th track, the stepping motor 30 rotates the cam 241 to a position (the step position −2 in a first characteristic region A shown in FIG. 9) which is two steps before the standard position of rotation of the cam 241 where the head 3a traces the regular position of the n-th track. In this position, erasing current is supplied to the head (i.e., the inner head 3a of the head 3) and the floppy disc is driven to make one revolution so that an annular portion of the n-th track including its outer side edge is circularly erased. Then, the cam 241 is rotated to its standard position of rotation for the n-th track (the center step position 0 in the sluggish characteristic region B shown in FIG. 9), where the head 3a performs circular erasure with respect to the standard position of the n-th track. Further, the cam 241 is rotated to a position (the step position 2 in another first characteristic region C shown in FIG. 9) which is two steps after the standard position of rotation of the cam 241 for the n-th track and in this position an annular portion of the n-th track including its inner side edge is circularly erased in the same way as described above. Clearly, the stepwise operation of the cam 241, therefore of the head 3a, is made in response to the position control signal PC from the control circuit 9 in FIG. 2. Being similar to the system described above with reference to FIGS. 2, 3(a), 3(b) and 4, the annular area with its width extending from the standard position of the n-th track to the outer and inner side edges is circularly erased. Therefore, no unerased portions will remain along sides or edges of the track. Although the erased area is extended by ±2 steps rotation of the motor in the above embodiment, the number of steps for erasing may be set arbitrarily, for example ±1 or ±3, if necessary. Of course, any other order of tracks than that from outer to inner track may be selected for erasure.

Then, the operation at the time of reproduction and head access will be described. In this embodiment, in order to effectuate tracking control for the n-th track, driving pulses are supplied from the motor driving circuit 13 in FIG. 2 to the stepping motor 14 to cause an angle of rotation of, for example, one or two steps (1 or 2 units on the horizontal axis in FIG. 9) in the positive direction (the counterclockwise direction in FIG. 3(a)), or one or two steps (−1 or −2 units on the horizontal axis in FIG. 9) in the opposite direction, whereby the first characteristic portions 255, exhibiting the first characteristic regions A or C in FIG. 9, of the cam 241 operates to properly implement fine tracking control. Responding to fine stepping revolution of the cam 241, the cam follower corresponding to it is relatively dislodged into an adjacent portion of a periphery of the cam 241 very easily. Accordingly, a delicate and very sensitive tracking control can be performed. On the other hand, when the head accesses the n+1-th track from the n-th track, the second characteristic portion 252, exhibiting the second characteristic region D in FIG. 9, provided between the first characteristic portions 255, namely corresponding to the third to ninth rotating steps of the stepping motor, operates to provide the head with a relatively abrupt displacement so that the head shifts quickly from the n-th to n+1-th track position. Of course, the tracking control for the n+1-th track is made in the same way as the n-th track. The head access and tracking control for the n+2-th, n+3-th, . . . tracks are also made in the same manner.

In this embodiment, inasmuch as each sluggish characteristic portion 250 is so formed as to exhibit a zero or minute secondary output motion responding to the primary one step rotating input motion to the cam, as a motion converting means the influence of the ripple components of the rotation of the motor (therefore the cam 241), if any, can be minimized to realize stable tracking at an optimum fine step. In addition, the first characteristic portions 255 having the characteristics of A and C in FIG. 9 make a fine and smooth tracking control possible, as mentioned above.

The motion conversion characteristics shown in FIG. 9 can be obtained by employing a variety of motion transmitting mechanisms other than the mentioned type of disc cam, such as a grooved cam as shown in FIG. 6, or helically grooved cylindrical cam the assembling form of which is similar to that of FIG. 7, etc.

Still another embodiment of the present invention will be described below with reference to FIGS. 10 to 15.

Figure 10:
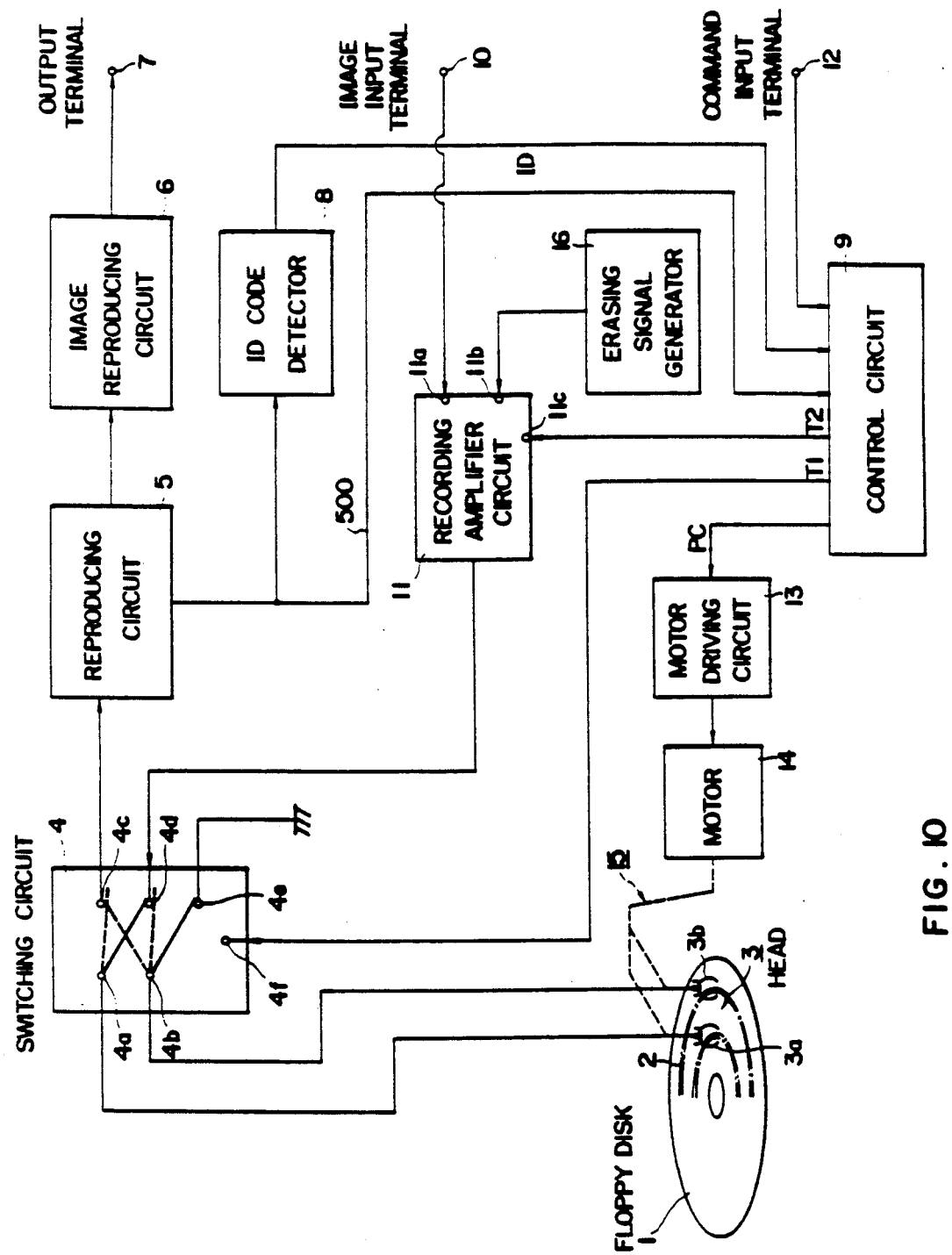
FIG. 10 is a block diagram showing an electric circuit of an apparatus as still another embodiment of the present invention.

FIG. 10 is a block diagram showing an electric circuit of still another embodiment of the present invention to be contrasted with the circuit shown in FIG. 2. In FIG. 10, each block corresponding to that of FIG. 2 is designated by the same numerical sign, and particularly, a signal line 500 is additionally provided for directly supplying the second output signal (i.e., input signal to an ID code detector 8) to a control circuit 9. In the main, the operation of the circuit of FIG. 10 is identical to that of FIG. 2.

Figure 11:
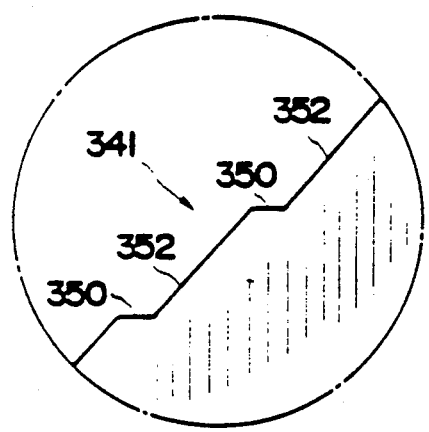
FIG. 11 is a reversed, detailed plan view, on an enlarged scale, of a portion of a motion converting element of still another embodiment of the present invention.
Figure 12:
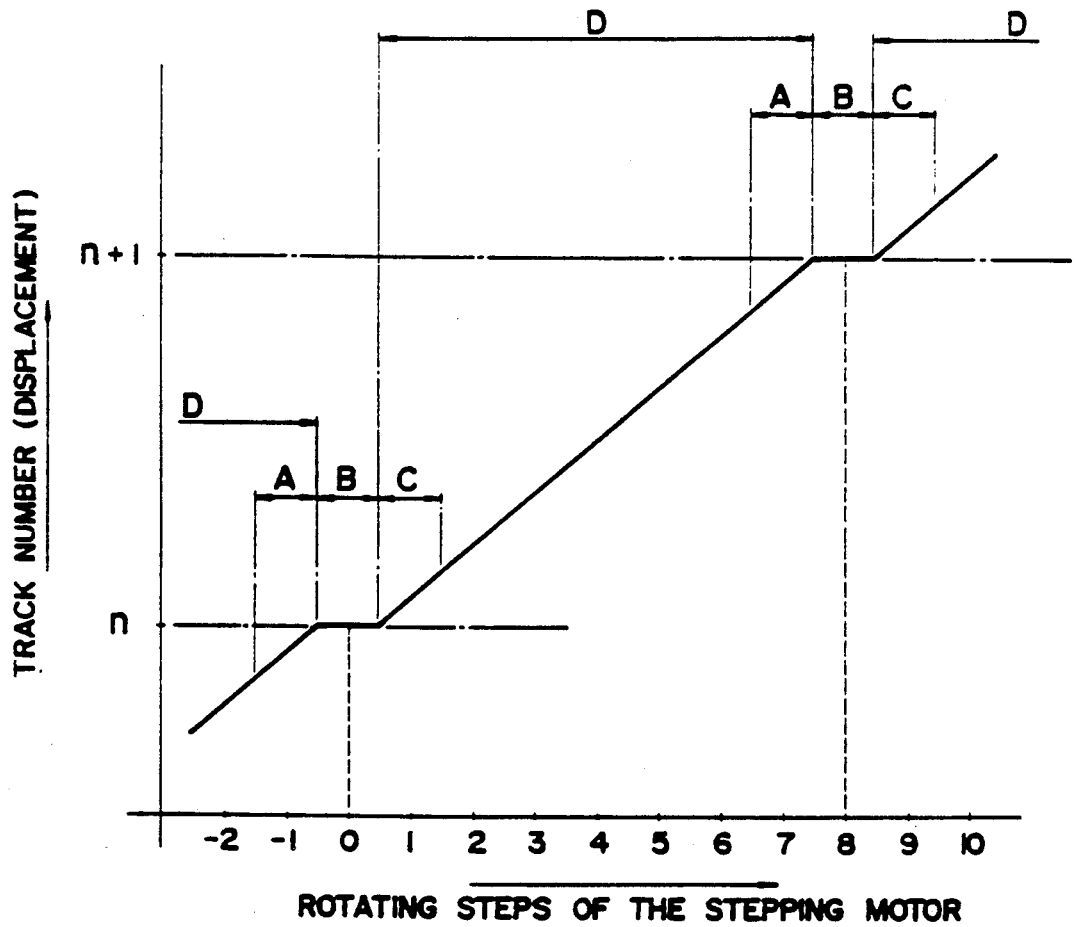
FIG. 12 is a graph depicting motion conversion characteristics of the mechanism in FIG. 11.

FIG. 11 shows a reversed, detailed plan view, on an enlarged scale, of a portion of a motion converting element of that embodiment to be contrasted with the embodiment of FIGS. 3(a) and 3(b). A disc cam 341 as a motion converting element of FIG. 11 is to be substituted for that of FIG. 3(a) in the motion transmitting system of FIG. 3(a) the assembling form of which is substantially identical to the embodiment mentioned below. Motion conversion characteristics of the disc cam 341 of FIG. 11 is depicted by a graph of FIG. 12. In FIG. 12, the angle of rotation of the stepping motor 14 is represented on the horizontal axis by the number of steps and the displacement of the head is represented on the vertical axis by the track number on the medium, in common with FIG. 4 or 9. As shown in FIG. 11, the disc cam 341 has a plurality of sluggish characteristic portions 350 spaced from each other and further advancing characteristic portions 352 linking the sluggish characteristic portions 350. Each sluggish characteristic portion 350 corresponds to a respective sluggish characteristic region B, and the advancing characteristic portion 352 corresponds to an advancing characteristic region D.

Now, the operation of the apparatus of FIG. 10, employing the disc cam 341 of FIG. 11 having the characteristics shown in FIG. 12, will be described below.

At the beginning, an example of erasing operation for the n-th track in the present embodiment will be described. In response to a command to erase the n-th track, the stepping motor 30 rotates the cam 341 to a position (the step position −1 in a part A of the advancing characteristic region D shown in FIG. 12) which is one step before the standard position of rotation of the cam 341 where the head 3a traces the regular position of the n-th track. In this position, erasing current is supplied to the head 3a and the floppy disc is driven to make one revolution so that an annular portion of the n-th track including its outer side edge is circularly erased. Then, the cam 341 is rotated to its standard position of rotation for the n-th track (the center step position 0 in the sluggish characteristic region B shown in FIG. 12), where the head 3a performs circular erasure with respect to the standard position of the n-th track. Further, the cam 341 is rotated to a position (the step position 1 in a part C of the advancing characteristic region D shown in FIG. 12) which is one step after the standard position of rotation of the cam 341 for the n-th track and in this position an annular portion of the n-th track including its inner side edge is circularly erased in the same way as described above.

Moreover, in this system, an appropriate head shifting is selectively taken so as to cope with deviation of an actual position of a track from the regular standard position thereof. In case the control circuit 9 detects that the actual track position is deviated inside from the regular position, the erasing operation is executed for the regular position, one step inside and two steps inside thereof. In case the control circuit 9 detects that the actual track position is deviated outside from the regular position, the erasing operation is executed for the regular position, one step outside and two steps outside thereof.

Clearly, the stepwise operation of the cam 341, therefore of the head 3a, is made in response to the position control signal PC from the control circuit 9 in FIG. 10. In the present apparatus, since an erasing operation is effectuated as described above, the annular area with its width extending from the actual position of the n-th track to the outer and inner side edges is circularly erased. Therefore, no unerased portions will remain along sides or edges of the track. Although the erased area is extended by ±1 step in the above embodiment, the number of steps for erasing may be set arbitrarily, for example, ±2, if necessary. Of course, an other order of tracks than that from outer to inner track may be selected for erasure.

Next, the operation at the time of reproduction and head access will be described. In this embodiment, in order to effectuate tracking control for the n-th track, driving pulses are supplied from the motor driving circuit 13 in FIG. 10 to the stepping motor 14 to cause an angle of rotation of, for example, one step (1 unit on the horizontal axis in FIG. 12) in the positive direction (the counterclockwise direction in FIG. 3(a)), or one step (−1 unit on the horizontal axis in FIG. 12) in the opposite direction, whereby a part of the advancing characteristic region 352 of the cam 341 (corresponding to the region C or A in FIG. 12) operates to properly implement fine tracking control. Responding to fine stepping revolution of the cam 341, the cam follower is relatively dislodged into an adjacent portion of the cam 341 very easily. Accordingly, a delicate and very sensitive tracking control can be performed. On the other hand, when the head 3 accesses the n+1-th track from the n-th track, the advancing characteristic portion 352 provided between the sluggish characteristic portions 350 (corresponding to the region D in FIG. 12) stretched from the first to eighth position of the rotating steps of the stepping motor operates to provide the head 3 with a relatively abrupt displacement so that the head 3 shifts quickly from the n-th to n+1-th track position. Of course, the tracking control for the n+1-th track is made in the safe way as the n-th track. The head access and tracking control for the n+2-th, n+3-th, ... tracks are also made in the same manner.

In this embodiment, inasmuch as each sluggish characteristic portion 350 of the cam 341 (corresponding to each sluggish characteristic region B in FIG. 12) is formed as mentioned above, the influence of the ripple components of the rotation of the motor 14 (therefore the cam 341), if any, can be minimized to realize stable tracking at an optimum fine step.

Figure 13:
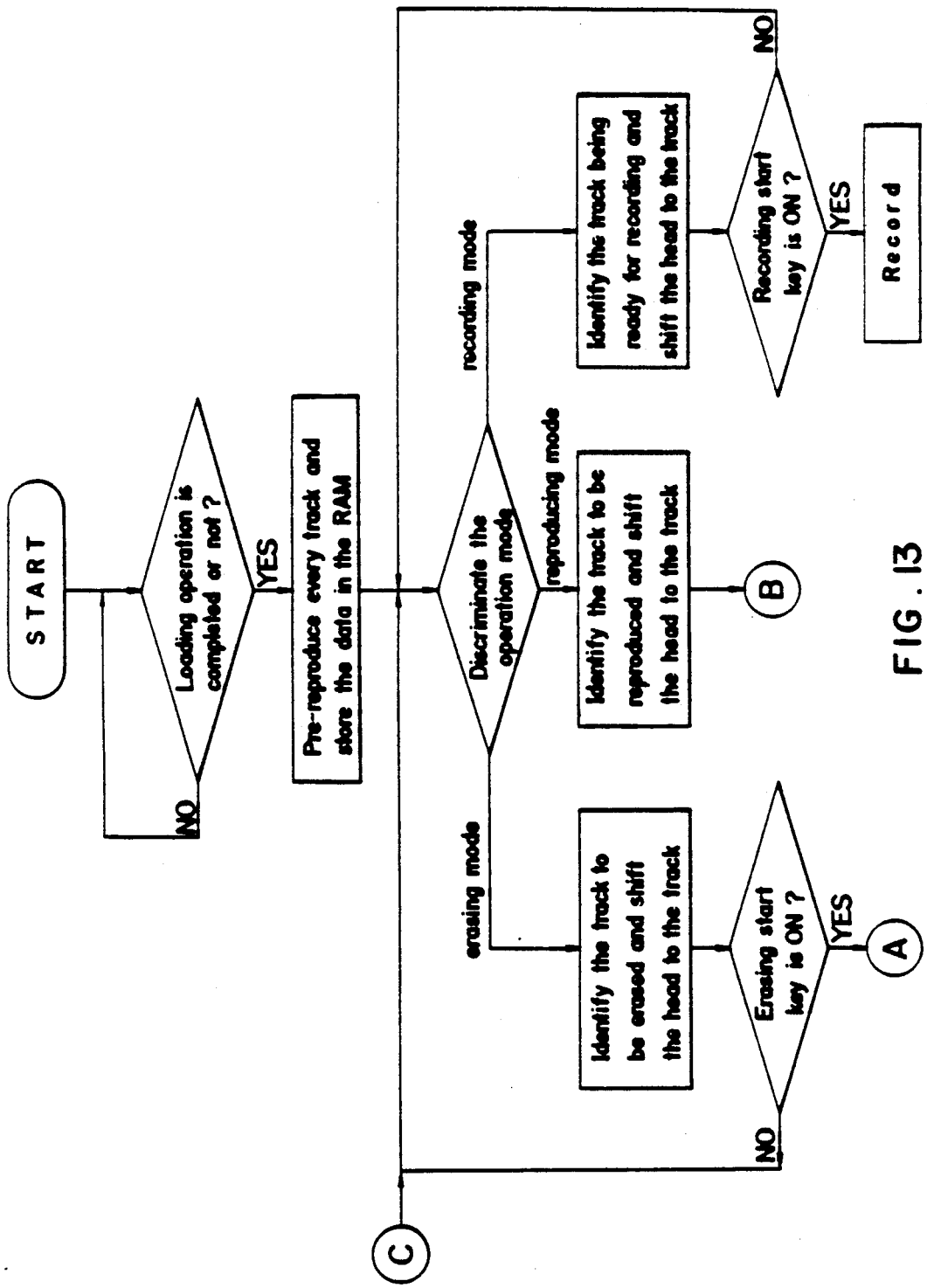
FIGS. 13, 14 and 15 are flow charts for explaining operation of the apparatus shown in FIG. 10.
Figure 14:
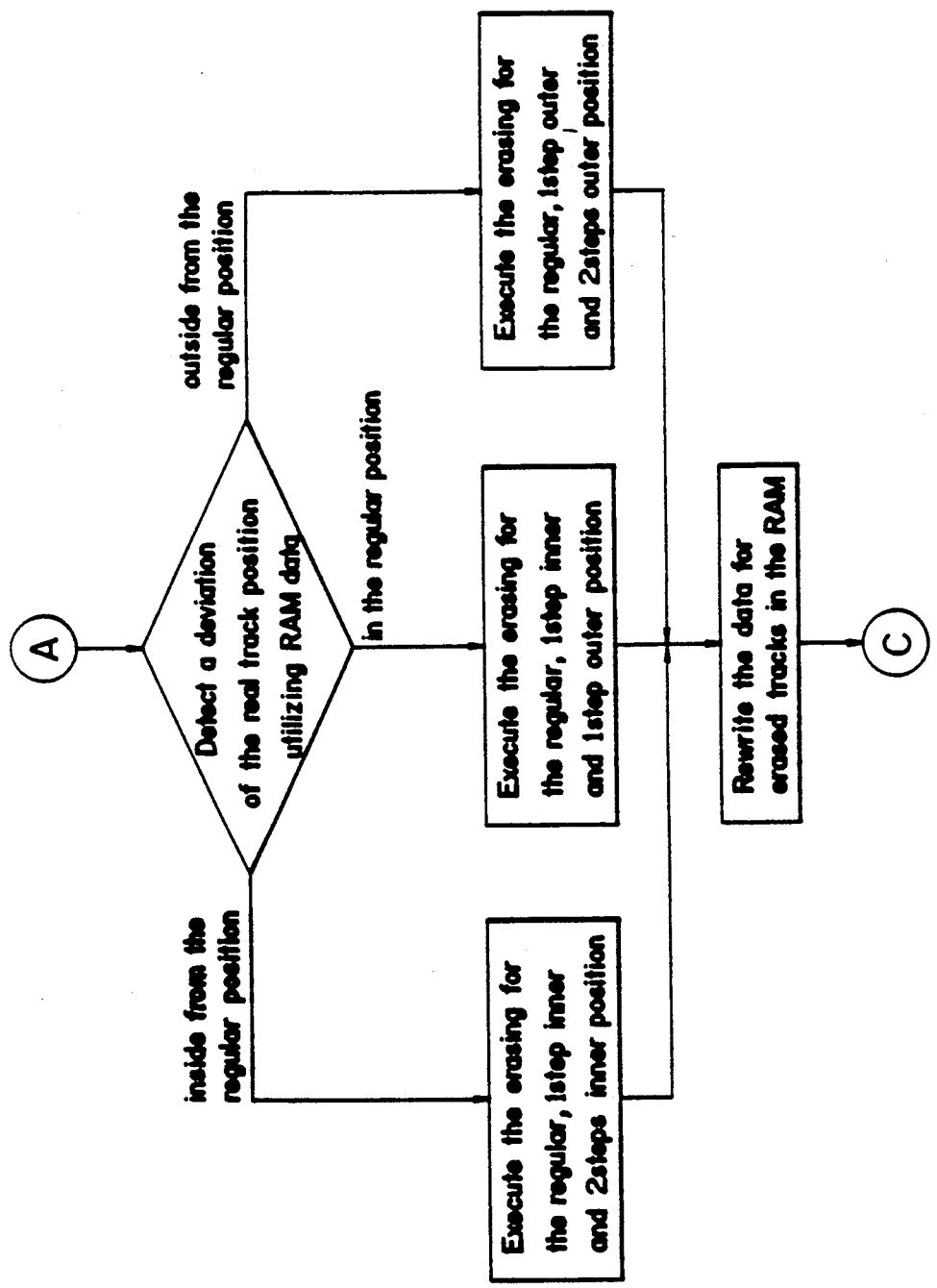
Figure 15:
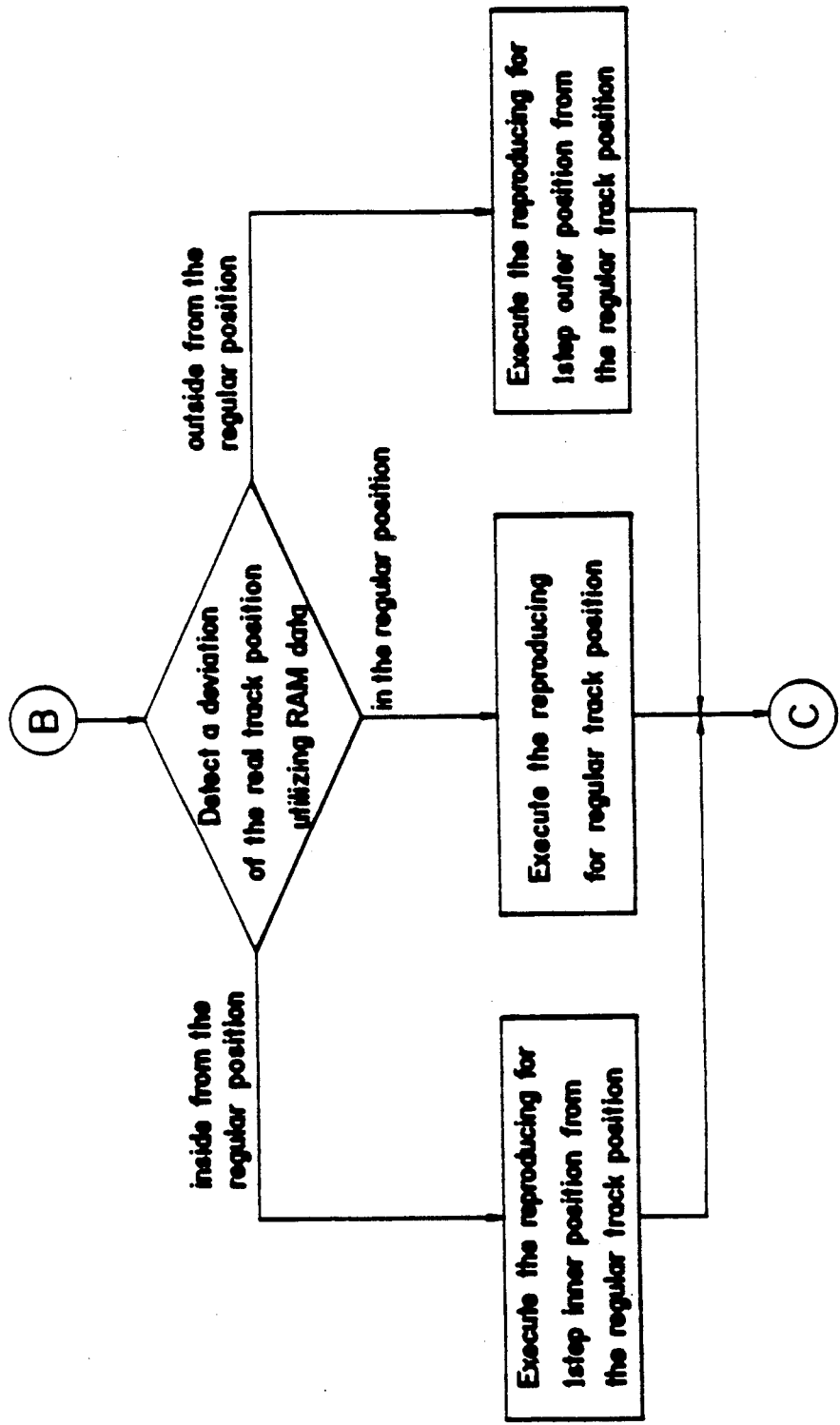

Now, the operation of the system will be described in more detail, utilizing flowcharts of FIGS. 13 to 15.

At first, the system of this embodiment determines whether the loading of the recording medium is completed or not. In case the system recognizes the completion of the loading operation, the system scans every track on the medium and reproduces information so as to store it respectively in a RAM provided in the control circuit 9, namely a pre-reproducing operation is carried out. In more detail, the pre-reproducing operation contains the following operations: the first is an envelope detection for the reproduced signal when the head is positioned at the regular position for the track; the second is an envelope detection for the reproduced signal when the head is positioned at one step outside from the regular track (i.e., displaced from the regular track position at a distance corresponding to one step rotation of the stepping motor 14); the third is an envelope detection for the reproduced signal when the head is positioned at one step inside from the regular track; and the fourth is a decoding of the ID signal for discriminating between field recording and frame recording. Each and every information obtained in the pre-reproducing operation is stored in the RAM of the control circuit 9 wherein every obtained envelope level as a result of the envelope detections is sampled at a predetermined rate and digitized respectively, then the respective sampled and digitized data are stored in the RAM. Subsequently, the control circuit discriminates among the operation modes, selectively set by a key or switch means (not shown) and designated by a command signal supplied via the command input terminal 12, namely the erasing operation mode, the reproducing operation mode and the recording operation mode. In case the erasing operation mode is set in the system, then the system identifies a track corresponding to certain information, for example, picture information, to be erased, and further shifts the head to the track. In the next place, the system ascertains whether an erase operation start key or switch (not shown) is on or off, based on a switch signal supplied via the command input terminal 12. In case the erase operation start key or switch is really in the ON state, then the system commences the erasing operation, namely performs a necessary change-over operation for the switching circuit 4 and excites the head 3 by supplying an erasing signal current via the recording amplifier circuit 11 and the switching circuit 4 in FIG. 10. If the erase operation start key or switch is in the OFF state, then the system is restored to the operation state for determining the operation mode set in the system. The erase operation start key is provided for protecting recorded information from an erasing operation due to an erroneous handling.

The erasing operation will be described below with reference to the flowchart of FIG. 14. At first, a state or tendency of positional deviation of a real track position from the regular standard position thereof is detected based on the data previously stored in the RAM as a result of the pre-reproducing operation. The detection is carried out by comparing the data concerning the envelope detections, performed at the time of the pre-reproducing operation, for one step outer position from the regular track, the regular track position, and one step inner position from the regular track. More particularly, the comparison, as an example, is carried out with respect to each added-up amount of the sampled level in the envelope detection for one revolution of the track. That is, a track position with the largest amount of the added-up sampled level brings out a tendency of the deviation of the track position. If it is ascertained based on the detection that the real track position is just in the regular position, the erasing operation is executed for the regular position, one step inside and one step outside thereof. If it is ascertained that the real track position is deviated inside, the erasing operation is executed for the regular position, one step inside and two steps inside thereof. If it is ascertained that the real track position is deviated outside, the erasing operation is executed for the regular position, one step outside and two steps outside thereof. After the erasing operation is carried out, the data concerning the erased tracks in the RAM are rewritten for matching the present state. Then, the system is restored to the operation state for determining the operation mode shown in FIG. 13.

In the operation state for determining the operation mode, if it is ascertained that the reproducing operation mode is set in the system, then the system identifies a track corresponding to certain information, for example, a picture information, designated to be reproduced, and further shifts the head to the track. The reproducing operation mode is represented in FIG. 15. At first, a state or tendency of the positional deviation of a real track position is detected based on the data previously stored in the RAM in the same manner as the erasing operation mode of FIG. 14 stated above. If it is ascertained based on the detection that the real track position is just in the regular position, the reproducing operation is executed for the regular position. If it is ascertained that the real track position is deviated inside, the reproducing operation is executed for one step inside of the regular track position. If it is ascertained that the real track position is deviated outside, the reproducing operation is executed for one step outside of the regular track position. After the operation is carried out, the system is restored to the operation state for determine the operation mode shown in FIG. 13.

In case it is ascertained that the recording mode is set in the system (refer to FIG. 13), then the system identifies a track being ready for recording information, for example, picture information, and shifts the head to the track. In the next place, the system ascertains whether a recording operation start key or switch (not shown) is on or off, based on a switch signal supplied via the command input terminal 12. If the recording operation start key or switch is really in the ON state, the system commences the recording operation, namely performs a necessary changeover operation for the switching circuit 4 and excite the head 3 by supplying an information signal to be recorded, via the image input terminal 10, the recording amplifier circuit 11 and the switching circuit 4 in FIG. 10. If tee recording operation start key or switch is in the OFF state, the system is restored to the operation state for determining the operation mode set in the system. Similar to the above-mentioned erase operation start key or switch, the recording operation start key is provided for protecting previously recorded information from a rewriting operation due to an erroneous handling.

The motion conversion characteristics shown in FIG. 12 can be obtained by employing a variety of motion transmitting mechanisms other than the mentioned type of disc cam, such as a grooved cam as shown in FIG. 6, or a helically grooved cylindrical cam the assembling form of which is similar to that of FIG. 7, etc.

The electric circuit of FIG. 10, the operations of which are described with reference to FIGS. 13 to 15, may also be used for the embodiments shown in FIGS. 3(a), 3(b), 6, 7 and 8. In that case, also in these embodiments, the pre-reproducing operation may be carried out to store the data concerning every track in the RAM of the control circuit 9, which controls the shifting of the head 3 in accordance with the tendency of positional deviation, detected based on the data stored in the RAM, of a real track position from its regular standard position. Further, after the erasing operation is carried out, the data concerning the erased tracks in the RAM may be rewritten for matching the present state.

In every embodiment described above, the erasing operation for a track is carried out by virtue of shifting the head to the three positions, that is, a regular position of the track and further inner and outer positions thereof. However, the erasing operation in the regular position is omissible because the annular area of the regular track position partially overlaps with the annular areas formed by shifting the head inside and outside of the regular track, respectively, so that the regular track is fully covered by the both inner and outer areas.

What is claimed is:

1. An apparatus for positioning a transducer for recording, reproducing or erasing information on a medium comprising:

a transducer support carriage for advancing said transducer in a predetermined direction;

driving force generating means for generating driving force to bring about a displacement of said transducer support carriage;

motion converting means operatively connected to said driving force generating means and to said transducer support carriage for converting an input motion from said driving force generating means to an output motion transmitted by said motion converting means to said transducer support carriage, said motion converting means having a motion conversion characteristic including a plurality of fine step pitch shifting regions spaced from each other and further including at least one rough pitch shifting region linking said fine step pitch shifting regions; and control means operatively connected to said transducer and to said driving force generating means (a) for energizing said driving force generating means to generate driving force to obtain an output motion of said motion converting means so that said transducer support carriage is moved in a range including said fine step pitch shifting region and at least a part of said rough pitch shifting region, and (b) for energizing said transducer at a first predetermined timing while said control means sets said apparatus for an information erasing operation mode, said first predetermined timing resulting in said transducer support carriage being moved in a range including said fine step pitch shifting region and at least a part of said rough pitch shifting region while said apparatus is erasing information in said information erasing mode and being moved in a portion of said rough pitch shifting region while said apparatus is not erasing information in said information erasing mode, and (c) for energizing said transducer at a second predetermined timing while said control means sets said apparatus for an information reproducing mode, said second predetermined timing resulting in said transducer being moved in a range including said fine step pitch shifting region and at least a part of said rough pitch shifting region while said apparatus is reproducing information in said information reproducing mode and being moved in a portion of said rough pitch shifting region while said apparatus is not reproducing information in said information reproducing mode.

2. An apparatus for positioning a transducer for recording, reproducing or erasing information on a medium comprising:

a transducer support carriage for advancing said transducer in a predetermined direction;

driving force generating means for generating driving force to bring about a displacement of said transducer support carriage;

motion converting means operatively connected to said driving force generating means and to said transducer support carriage for converting an primary input motion from said driving force generating means to an secondary output motion transmitted by said motion converting means to said transducer support carriage, said motion converting means having a motion conversion characteristic including a plurality of sluggish characteristic regions spaced from each other where a zero or a minute secondary output motion corresponds to a rated primary input motion and further including at least one advancing characteristic region linking said sluggish characteristic regions, where a predetermined amount of secondary output motion corresponds to the rate primary input motion; and control means operatively connected to said transducer and to said driving force generating means (a) for energizing said driving force generating means to generate driving force to obtain an output motion of said motion converting means so that said transducer support carriage is moved in a range including said sluggish characteristic region and at least a part of said advancing characteristic region, and (b) for energizing said transducer at a first predetermined timing while said control means sets said apparatus for an information erasing operation mode, said first predetermined timing resulting in said transducer support carriage being moved in a range including said sluggish characteristic region and at least a part of said advancing characteristic region while said apparatus is erasing information in said information erasing mode and being moved in a range including said advancing characteristic region while said apparatus is not erasing information in said information erasing mode, and (c) for energizing said transducer at a second predetermined timing while said control means sets said apparatus for an information reproducing mode, said second predetermined timing resulting in said transducer being moved in a range including said fine step pitch shifting region and at least a part of said rough pitch shifting region while said apparatus is reproducing information in said information reproducing mode and being moved in a portion of said rough pitch shifting region while said apparatus is not reproducing information in said information reproducing mode.

3. An apparatus in accordance with claim 1 or 2, wherein said transducer support carriage is movably guided by a guide member capable to shift in a direction traversing tracks formed on a recording medium used in said apparatus.

4. An apparatus in accordance with claim 1 or 2, wherein said driving force generating means comprises a stepping motor.

5. An apparatus in accordance with claim 1 or 2, wherein said motion converting means comprises a disc cam.

6. An apparatus in accordance with claim 1 or 2, wherein said motion converting means comprises a spirally grooved disc cam.

7. An apparatus in accordance with claim 1 or 2, wherein said motion converting means comprises cylindrical cam means with an approximate helical groove on the peripheral surface thereof.

8. An apparatus in accordance with claim 1 or 2, wherein said control means comprises a microcomputer.

9. An apparatus in accordance with claim 1 or 2, wherein said control means comprises detecting means for detecting a tendency of deviation of the position of a real track formed on a medium used in the apparatus from a predetermined position.

10. An apparatus in accordance with claim 1 or 2, wherein said control means comprises a RAM for storing information reproduced from every track formed on a disc medium used in said apparatus as a recording medium, said information being obtained via head means as the transducer which scans the tracks.

11. An apparatus in accordance with claim 1 or 2, wherein said control means discriminates field recording from frame recording when information reproduced via head means as the transducer is video information.

12. An apparatus in accordance with claim 1 or 2, wherein said control means simultaneously erases a pair of tracks for video information of frame recording by exciting a two-channel head provided in said apparatus as the transducer applicable for erasure when said head is just positioned at the tracks to be erased.

13. An apparatus in accordance with claim 1 or 2, wherein said control means rewrites data in a RAM, provided in said control means, concerning the present state to be recorded on a medium used in said apparatus whenever recorded information is erased.

14. An apparatus in accordance with claim 1 or 2, wherein said control means comprises changeover circuit means for changing over a connection concerning head means as the transducer so as to selectively change the functions thereof including recording, reproducing and erasing information.

15. An apparatus in accordance with claim 1 or 2, wherein said control means scans and reproduces every track on a medium used in said apparatus and stores all reproduced information in a RAM provided in said control means, prior to the commencement of executing an erasing operation for a track to be erased.

16. An apparatus in accordance with claim 1 or 2, wherein said control means controls positioning of said transducer so that the transducer is positioned just on an annular track to be erased and outside and inside thereof at a predetermined distance, respectively, in an erasing operation mode, due to a stepwise shifting operation via a stepping motor as the driving force generating means, said motion converting means and said transducer support carriage.

17. An apparatus in accordance with claim 1 or 2, wherein said control means controls positioning of said transducer so that the transducer is positioned both outside and inside of an annular position of a track to be erased at a predetermined distance, respectively, in an erasing operation mode, due to a stepwise shifting operation via a stepping motor as the driving force generating means, said motion converting means and said transducer support carriage.

18. An apparatus in accordance with claim 1 or 2, wherein said transducer comprises a magnetic head of a two-channel type applicable to erasing operation.

19. An apparatus in accordance with claim 1 or 2, wherein said transducer comprises a magnetic head of a single-channel type applicable to erasing operation.

20. An apparatus in accordance with claim 1 or 2, wherein said transducer comprises a magnetic head having pad means for attracting toward the head a floppy disc used in said apparatus as a recording medium, utilizing hydrodynamic phenomenon so as to obtain a good head touch, while a relative velocity of the floppy disc with respect to the head is over a predetermined degree.

21. An apparatus in accordance with claim 1, wherein said motion converting means is formed in such a manner that each center portion of said fine step pitch shifting regions thereof corresponds to a respective regular track position on a rotatable disc as a medium used.

22. An apparatus in accordance with claim 2, wherein said motion converting means is formed in such a manner that each portion of said sluggish characteristic regions corresponds to a respective regular position on a rotatable disc as a medium used.

23. An apparatus in accordance with claim 1 or 2, wherein said control means controls a stepping motor, as the driving force generating means, via motor driving circuit means.

24. A method for positioning a transducer for recording, reproducing or erasing information on a medium comprising:
generating a driving force to bring about a displacement of a transducer support carriage by energizing a driving force generating means at a predetermined timing while a control means sets the apparatus for an information erasing operation mode;
converting the driving force to an output motion using a motion converting means operatively connected to the driving force generating means and to the transducer support carriage and having a motion conversion characteristic including a plurality of fine step pitch shifting regions spaced from each other and further including at least one rough pitch shifting region linking the fine step pitch shifting regions;
transmitting the output motion to the transducer support carriage to move the transducer in a range including the fine step pitch shifting region and at least a part of the rough pitch shifting region;
energizing the transducer at a first predetermined timing while said control means sets said apparatus for an information erasing operation mode, the first predetermined timing resulting in the transducer support carriage being moved in a range including the fine step pitch shifting region and at least a part of the rough pitch shifting region while the apparatus is erasing information in said information erasing mode and being moved in a portion of the rough pitch shifting region while the apparatus is not erasing information in said information erasing mode; and
energizing the transducer at a second predetermined timing while said control means sets said apparatus for an information reproducing operation mode, the second predetermined timing resulting in the transducer support carriage being moved in a range including the fine step pitch shifting region and at least a part of the rough pitch shifting region while the apparatus is reproducing information in said information reproducing mode and being moved in a portion of the rough pitch shifting region while the apparatus is not reproducing information in said information reproducing mode.

25. A method for positioning a transducer for recording, reproducing or erasing information on a medium comprising:
generating a driving force to bring about a displacement of a transducer support carriage by energizing a driving force generating means at a predetermined timing while a control means sets the apparatus for an information erasing operation mode;
converting the driving force to an output motion using a motion converting means operatively connected to the driving force generating means and to the transducer support carriage and having a motion conversion characteristic including a plurality of sluggish characteristic regions spaced from each other where a zero or a minute secondary output motion corresponds to a rated primary input motion and further including at least one advancing characteristic region linking the sluggish characteristic regions, where a predetermined amount of secondary output motion corresponds to the rated primary input motion; and
transmitting the output motion to the transducer support carriage to move the transducer in a range including the sluggish characteristic region and at least a part of the advancing characteristic region;
energizing the transducer at a first predetermined timing while said control means sets said apparatus for an information erasing operation mode, the first predetermined timing resulting in the transducer support carriage being moved in a range including the fine step pitch shifting region and at least a part of the rough pitch shifting region while the apparatus is erasing information in said information erasing mode and being moved in a portion of the rough pitch shifting region while the apparatus is not erasing information in said information erasing mode; and
energizing the transducer at a second predetermined timing while said control means sets said apparatus for an information reproducing operation mode, the second predetermined timing resulting in the transducer support carriage being moved in a range including the fine step pitch shifting region and at least a part of the rough pitch shifting region while the apparatus is reproducing information in said information reproducing mode and being moved in a portion of the rough pitch shifting region while the apparatus is not reproducing information in said information reproducing mode.

26. A method according to claim 24 or 25 further comprising movably guiding the transducer support carriage using a guide member capable of shifting in a direction traversing tracks on a recording medium.

27. A method according to claim 24 or 25 further comprising a detecting a tendency of deviation of the position of a real track formed on a medium used in the apparatus from a predetermined position.

28. A method according to claim 24 or 25 further comprising obtaining and storing information reproduced from every track formed on a disc medium used in the apparatus as a recording medium.

29. A method according to claim 24 or 25 further comprising discriminating field recording from frame recording when information reproduced by head means is video information.

30. A method according to claim 24 or 25 further comprising exciting a two-channel head provided in the apparatus as the transducer applicable for erasure when the head is positioned at a pair of tracks to be erased to erase the pair of tracks simultaneously.

31. A method according to claim 24 or 25 further comprising rewriting in a RAM data concerning the present state to be recorded on a medium whenever recorded information is erased.

32. A method according to claim 24 or 25 further comprising changing over a connection concerning head means such as the transducer to selectively change the functions thereof including recording, reproducing or erasing information.

33. A method according to claim 24 or 25 further comprising scanning and reproducing every track on a medium and storing all reproduced information in a RAM prior to executing an erasing operation for a track to be erased.

34. A method according to claim 24 or 25 further comprising positioning the transducer just on an annular track to be erased and outside and inside thereof at a predetermined distance, respectively, in an erasing operation mode.

35. A method according to claim 24 or 25 further comprising positioning the transducer both outside and inside of an annular position of a track to be erased at a predetermined distance, respectively, in an erasing operation mode.

* * * * *